United States Patent [19]

Wine

[11] Patent Number: 4,691,310

[45] Date of Patent: Sep. 1, 1987

[54] COMPACT DISK READ ONLY MEMORY RECORDING SYSTEM WITH SPEED CONTROL

[75] Inventor: Charles M. Wine, Mercer County, N.J.

[73] Assignee: RCA Corporation, Princeton, N.J.

[21] Appl. No.: 763,969

[22] Filed: Aug. 9, 1985

[51] Int. Cl.⁴ ............................................. G11B 7/00
[52] U.S. Cl. ...................................... 369/50; 369/59; 358/342; 360/73
[58] Field of Search ..................... 369/50, 51, 59, 240, 369/133, 47, 32; 358/342; 360/73

[56] References Cited

U.S. PATENT DOCUMENTS

| | | | |
|---|---|---|---|
| 4,146,910 | 3/1979 | Oliver et al. | 360/72 |
| 4,190,860 | 2/1980 | Somers et al. | 358/128.5 |
| 4,514,771 | 4/1985 | Stark et al. | 360/73 |
| 4,530,083 | 7/1985 | Ishihara | 369/240 X |

Primary Examiner—Robert L. Richardson
Attorney, Agent, or Firm—Joseph S. Tripoli; Henry I. Steckler

[57] ABSTRACT

Digital computer data recorded in a spiral track on the surface of a disk using a laser recording head which moves radially across the disk as it revolves at a constant linear velocity. A system for controlling the disk velocity during the recording process includes a device for counting each convolution of the spiral and means for calculating the number of bits of information which should optimally be recorded in that convolution. A counter keeps track of the number of bits which are actually being recorded in that convolution. The calculated number of bits is compared with the number of bits actually recorded to produce a control signal for regulating the speed at which the disk revolves.

12 Claims, 2 Drawing Figures

COMPACT DISK READ ONLY MEMORY RECORDING SYSTEM WITH SPEED CONTROL

The present invention relates to a system for recording information on a disk such as those used to store computer data, and more particularly, to controlling the rotational speed of the disk during the recording process.

BACKGROUND OF THE INVENTION

Recently compact audio disk systems have been introduced into the market place. These systems use a small disk, approximately 12 centimeters in diameter into which digitized audio information has been pressed in a spiral information track. The playback unit utilizes a laser beam focused on the track to read out the digitized information. The read out information is then converted to an analog audio signal and fed to conventional audio amplifiers and speakers.

It was soon realized that these compact disks could also be used for mass storage of digital information for a computer. In this application, the device is referred to as a compact disk read only memory (CD-ROM). A single compact disk can contain 19 billion bits (approximately 2.5 billion bytes) of digital information. The data are recorded on a master disk at a constant linear velocity and a constant length for each recorded bit. As a result, each convolution of the spiral track contains a different number of bits.

Unlike the typical playback of an audio record, the access of data from a CD-ROM does not necessarily occur in the same sequence as it was recorded. For random access applications, the playback head jumps to various points on the spiral track to read out the desired data. For example, if video information for a game is stored on a disk, the next scene to be displayed may vary depending on a selection by the game player (e.g., which door gets opened or which path is chosen). The selection may require a scene which is stored several convolutions of the spiral track from the present location of the head. The head will then rapidly move radially jumping across several convolutions on the disk to the desired one.

However, once the head completes the rapid radial movement and has synchronized to the recorded data, the system may have to wait up to one full revolution of the disk before the beginning of the desired data is located under the pickup head. This time delay between when the head is ready to read and when the data are actually present under the head is known as rotational latency. Although this delay is a fraction of a second, it may be a relatively long interval in terms of computer speed. In order to minimize the rotational latency, the data could be recorded in the spiral track beginning at the exact location where the head will be when it is ready to read out the next scene. Considering the very large storage capacity of the compact disk, one need not be concerned with economizing the recording space and there may be gaps between different items of data in order to precisely locate the data for optimal access. In the above game example, the scenes for each path selection would be positioned on the disk so that they would be immediately available when the playback head jumps to them from the branch position.

However, this minimization of rotational latency requries that one know exactly where on the disk to record the information and the use of a highly controlled recording process. In principle, the location of each bit in the track could be calculated and used by the computer to optimize the data access. However, since the speed of the disk and the rate at which the data are recorded are independent of each other, variation of one or the other parameter will unpredictably vary the location of a given bit from its calculated position.

Although various recording systems have been developed for maintaining the speed of the rotating disk at a constant linear velocity, such systems have not been keyed to the rate of the data being recorded. Therefore, although these systems provide an approximately constant linear velocity during recording, they are not accurate enough for reducing the rotational latency as discussed above.

SUMMARY OF THE INVENTION

A data storage system is provided in which the information is recorded in a spiral track in a disk by a recording head that moves radially as the disk revolves. The system includes an apparatus to provide an indication of the radial position of the recording head and means for calculating the optimal amount of information to be contained in the convolution of said spiral track at the determined radial position of the recording head. A counter is also included for determining the amount of information which is actually recorded in said convolution. The speed at which the mastering disk revolves is then varied based upon a comparison of the calculated and the actual amounts of information for said convolution.

DETAILED DESCRIPTION OF THE PREFERRED EMBODIMENT

The Circuit

Figure 1:
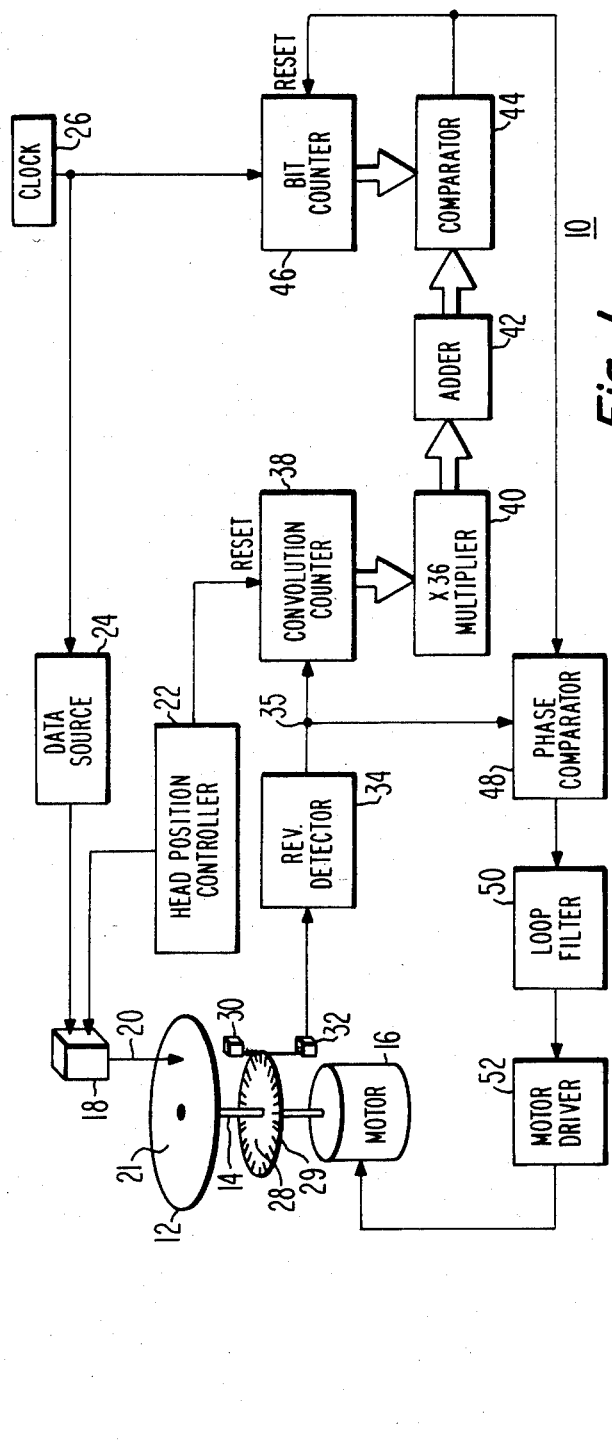
FIG. 1 is a schematic block diagram of a compact disk master recording system utilizing a speed control according to the present invention.

FIG. 1 schematically shows an apparatus for producing a master disk from which a plurality of compact read only memory disks may be pressed using processes similar to those involved in pressing compact audio disks. The apparatus 10 comprises a master disk 12 which is rotated by a shaft 14 driven by motor 16. A recording head assembly is schematically shown as block 18 and includes a laser which produces beam 20, the necessary optics and a translation mechanism for moving the head and laser beam 20 radially across the surface of disk 12. Alternatively, the head 18 could remain stationary and the laser beam could radially move across the disk surface by means of scanning optics. The translational movement of the laser beam 20 is done under the guidance of a head position controller 22 which produces uniform translational movement as the disk revolves. The information to be recorded is supplied to the head 18 from a digital data source 24 and modulates the laser beam 20. The data source supplies the data to the head 18 at a rate controlled by a system clock 26, which defines the rate at which data is recorded onto the master disk 12. The radial movement of the laser beam records the data in a spiral track on the disk surface, 21.

Also mounted on the motor shaft is a timing disk 28 having one or more notches cut in its circumferential surface 29. A light source 30 and a light detector 32 are aligned with the edge of the timing disk 20 so that the light beam from the source 30 will be interrupted by the disk vanes formed between the notches. As the timing disk 28 spins a pulsed transmission of the light from the source 30 is received at the detector 32 producing a pulsed electrical signal. This signal is coupled to the input of a revolution detector 34, which counts the number of pulses produced by the light detector 32 and produces an output at node 35 indicating that one revolution of the timing disk 28 (and also disk 12) has occurred. For example, if there are thirty-six notches cut in the periphery of disk 28, the revolution detector 34 will produce an output pulse upon its receipt of thirty-six pulses from the light detector 32. Alternatively, the timing disk 28 could contain a single notch and the revolution detector 34 could be eliminated, in which case, the light detector output would be directly connected to node 35.

The output of the revolution detector 34 is connected to the input of a convolution counter 38. The convolution counter has a reset terminal connected to the head position controller 22. The output of the convolution counter 38 is connected to a multiplier 40 which multiplies the output of the convolution counter by a constant. The product of the mutiplication is fed to an adder 42 which adds the product to a constant and feeds the sum to the first input of a comparator 44. The second input of the comparator is connected to the output of a bit counter 46 which counts the number of pulses from the system clock 26. The comparator 44 has an output which indicates when the two input values are equal. This output is coupled to the reset terminal of the bit counter 46 and to one input of a phase comparator 48. The other input of the phase comparator is connected to node 35 to receive the output of the revolution detector 34.

The output of the phase comparator is fed through a loop filter 50 to a motor drive circuit 52. The motor drive circuit controls the application of power to the motor 16 in a conventional manner to control its speed.

Theory of Operation

It is noted that the purpose of this invention is to synchronize the speed of the disk to the data rate to record the proper number of bits in each convolution. This ensures that each item of data can be recorded on the disk in a predetermined location enabling optimum readout access. Because the disk 12 rotates at a constant linear velocity, rather than a constant angular velocity, the number of bits recorded in each convolution will vary. A greater number of bits will be recorded in each convolution as the head 18 moves radially outward from the disk center. The optimal number of bits for any convolution is given by the equation:

$$B = (2*\pi*R_i/BL) + (2*\pi*CS*NC/BL) \qquad (1)$$

where B is the number of data bits for said convolution, $R_i$ is an inner reference radius such as the radius of the innermost part of the disk spiral track at which recording occurs, BL is the length of the data bit as recorded in the disk track, CS is the spacing between adjacent convolutions, and NC is the number of the desired convolution as counted from the inner reference radius.

One proposal for a CD-ROM calls for the bit length (BL) to be 0.278 microns with a spacing between convolutions (CS) of 1.6 microns. One may arbitrarily select an inner reference radius ($R_i$) as being $2.5 \times 10^4$ microns. By inserting these numbers into the equation (1) above, the number of bits per convolution is approximately given by:

$$B = 565034 + 36*NC. \qquad (2)$$

(It is noted that Pi is an irrational number and a rational approximation must be used). As will be seen in the following explanation of the operation of the recording system 10, this formula may be solved to produce a signal for controlling the speed for the mastering disk 12.

It will be apparent to those skilled in the art that with minor modification to the present system and equation (1), the recording may move inward from the outermost position much like that of a conventional audio record. In this modified system the number of bits in a given convolution is given by:

$$B = (2*\pi*R_o/BL) - (2*\pi*CS*NC/BL) \qquad (3)$$

where $R_o$ is an outer reference radius such as the radius of the outermost part of the disk spiral track at which recording occurs.

System Operation

As the disk 12 spins, the data is supplied by the data source 24 to the recording head 18 at a rate controlled by the clock 26. The head position controller 22 moves the head radially across the disk surface to produce the spiral track of recorded information on the disk's surface. For ease of explanation it will be assumed that the head begins at the innermost portion of spiral track (at inner radius $R_i$) and moves radially outward.

The recording commences by the head position controller 22 placing the head 18 at the innermost radius ($R_i$). At this point a reset signal is sent to zero the convolution counter 38 indicating that the head is at the innermost convolution. Once the motor 16 has reached the recording velocity for the first convolution, recording is begun by clocking data from the source 24 to the recording head 18 and modulating the laser beam 20. The head positioner 22 provides a control signal to a head 18 to produce the radial motion of the beam across the surface of the disk as the disk rotates. The combined radial motion of the head and the disk rotation produce a spiral track. Each convolution of the track is the portion produced during each rotation. With each revolution of the disk 12, the light detector 32 produces an electrical signal having a given number of pulses equal to the number of notches in the circumference of the timing disk 28. These pulses are in turn counted by the revolution detector 34 which produces an output pulse at node 35 once for every revolution of the disk 12.

Each pulse at node 35 indicates the completion of the recording of data in one convolution of the spiral track. These convolutions are counted in counter 38, which provides an indication of the radial position of the recording head 18, and more importantly laser beam 20. The convolution number from counter 38 is multiplied by the number thirty-six in multiplier 40 and the product of that multiplication is added to the number 565034 by adder 42. The output of the adder 42 is a calculation of the number of bits that optimally should be contained in the convolution which has just been completed. That is the convolution counter 38, multiplier 40 and adder 46 solve equation (2) above. It is readily appreciated that if different dimensions were used for bit length, convolution spacing, etc. the constant in multiplier 40 and/or the addition constant in adder 42 would change to correspond with the change in the numbers in equation (2).

Figure 2:
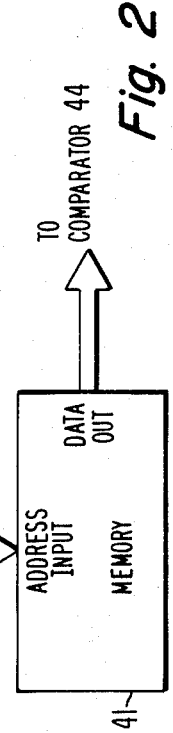
FIG. 2 is an alternative embodiment of a portion of the system in FIG. 1.

Alternatively, if these dimensions will always remain constant, the multiplier 40 and adder 42 could be replaced by a memory 41 configured as a look-up table (shown in FIG. 2). The convolution number from counter 38 is fed to the address input of the memory to select the memory location containing the optimal number of bits for that convolution. The number of bits is read out of the memory 41 and fed to the first input of the comparator 44.

As the master disk recording proceeds, the pulses from clock 26 are fed to bit counter 46 which contains a number representing the number of bits that is actually being recorded during each convolution. The output of the bit counter 46 is compared to the calculated bit count from adder 42 by comparator 44. When these two numbers are equal (i.e., the number in bit counter 46 reaches the optimal number for present convolution), the comparator 44 produces an output signal which resets the bit counter 46 to begin counting the number of bits in the next convolution.

The phase of the output signal from the comparator 44 is compared to the phase of the output of the revolution detector 34 by the phase comparator 48. The output of the phase comparator 48 indicates whether or not the proper number of bits for a given convolution has actually been recorded in that convolution and thus whether or not the motor 16 is rotating the disk 12 at the correct speed. The output of the phase comparator is fed through a loop filter 50 to the motor driver 52 as a control signal indicating whether the motor should change in speed in order to provide optimum recording. In order to maintain the linear velocity of the disk at the laser beam recording position constant, the speed of the motor will decrease as the beam moves radially outward.

With the present invention the speed control feedback loop is referenced to the rate at which the bits are recorded on the surface of the CD-ROM master disk. This ensures that the data being recorded will be placed in positions which can easily be computed and used for later accessing the data stored on the CD-ROM disk.

What is claimed is:

1. A computer data recording system for recording information comprising bits of data in a spiral track on a recording surface of a rotating disk by a recording head moving radially with respect to the axis of rotation of said disk, said system comprising:
    means for determining the radial position of said recording head;
    means for determining the optimal number of bits of data to be contained in the convolution of said spiral track at the determined radial position;
    means for counting the number of data bits provided from said recording head to said recording surface at said convolution; and
    means for controlling the speed at which said disk rotates in response to a comparison of the optimal number of data bits and the number of data bits provided from said recording head for said convolution.

2. The system as in claim 1 wherein the means for determining the radial position of said recording head comprises:
    means for indicating each time said disk makes one rotation; and
    means responsive to said indicating means of counting the rotations.

3. The system as in claim 2 wherein said speed controlling means comprises:
    means for comparing the optimal number of bits to the counted number of bits for said convolution and for generating an output signal when the counted number equals the determined optimal number; and
    a phase comparator for comparing said comparing means output signal to the output from said rotation indicating means, said phase comparator providing an output signal to control the rotational speed of said disk.

4. The system as in claim 2 wherein said head moves radially outward during recording, and said means for determining the optimal number of bits comprises means for solving the equation:

$$B = (2\pi^* R_i/BL) + (2^*\pi CS^* NC/BL),$$

where B is optimal the number of data bits for said convolution, $R_i$ is an inner reference radius on said disk recording surface, BL is the length of a data bit, CS is the spacing between adjacent convolutions, and NC is the ordinal number of said convolution counted from the inner reference radius.

5. The system as in claim 2 wherein said head moves radially inward during recording, and said means for determining the optimal number of bits comprises means for solving the equation:

$$B = (2^*\pi^* R_o/BL) - (2^*\pi^* CS^* NC/BL),$$

where B is the optimal number of data bits for said convolution, $R_o$ is an outer reference radius on said recording surface, BL is the length of a data bit, CS is the spacing between adjacent convolutions, and NC is the ordinal number of said convolution counted from the outer reference radius.

6. The system as in claim 1 wherein said means for determining the optimal number of bits comprises a look-up table in a memory.

7. An apparatus for use in a data recording system, said apparatus for controlling the rotational speed of a disk having a recording surface during the recording of information in a spiral track thereon; said apparatus comprising:
    means for determining the ordinal number of a convolution of said spiral in which the information is being recorded;
    means for determinng the optimal amount of information to be recorded in said convolution;
    means for determining the actual amount of information being recorded in said convolution; and
    means for varying the rotational speed of said disk in response to a comparison of the optimal and the actual numbers of bits for said convolution.

8. The apparatus as in claim 7 wherein said means for determining the ordinal number of said convolution comprises:
    means for providing a counting signal indicative of a complete rotation of said disk; and a counter responsive to said counting signal.

9. The apparatus as in claim 7 wherein the information is digital data and said means for determining the optimal amount of information comprises means for solving the equation:

$$B=(2*\pi*R_i/BL)+(2*\pi*CS*NC/BL),$$

where B is the optimal number of data bits for said convolution, $R_i$ is an inner reference radius on said disk recording surface, BL is the length of a data bit, CS is the spacing between adjacent convolutions, and NC is the ordinal number of said convolution counted from the inner reference radius.

10. The apparatus as in claim 7 wherein the information is digital data and said means for determining the optimal amount of information comprises means for solving the equation:

$$B=(2*\pi*R_o/BL)-(2*\pi*CS*NC/BL),$$

where B is the optimal number of data bits for said convolution, $R_o$ is an inner reference radius on said disk recording surface, BL is the length of a data bit, CS if the spacing between adjacent convolutions, and NC is the ordinal number of said convolution counted from the inner reference radius.

11. The apparatus as in claim 7 wherein said means for determining the optimal amount of said information comprises a look-up table in a memory.

12. The apparatus as in claim 7 wherein said information is digital data and said means for determining the actual amount of information comprises a counter for counting the number of bits of data being recorded.

* * * * *